US007669457B2

(12) United States Patent
Griffith et al.

(10) Patent No.: US 7,669,457 B2
(45) Date of Patent: Mar. 2, 2010

(54) APPARATUS AND METHOD OF SMOKE DETECTION

(75) Inventors: Bruce R. Griffith, Geneva, IL (US); Ludger L K Koester, Aurora, IL (US); Mark C. Bohanon, Aurora, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/175,318

(22) Filed: Jul. 17, 2008

(65) Prior Publication Data

US 2009/0025453 A1 Jan. 29, 2009

Related U.S. Application Data

(60) Provisional application No. 60/951,505, filed on Jul. 24, 2007.

(51) Int. Cl.
*G01N 15/02* (2006.01)

(52) U.S. Cl. .................................................... 73/31.01

(58) Field of Classification Search ....................... None
See application file for complete search history.

(56) References Cited

U.S. PATENT DOCUMENTS 1,969,626 A 8/1934 Simon et al.
3,326,221 A * 6/1967 Huffman et al. ............ 131/343
3,369,346 A 2/1968 Wildbolz et al.
4,035,788 A 7/1977 Barr
4,223,559 A 9/1980 Chuan et al.
4,254,414 A 3/1981 Street et al.
4,473,478 A 9/1984 Chivrall
5,420,440 A 5/1995 Ketler et al.
5,610,592 A 3/1997 Okazaki
6,166,648 A 12/2000 Wiemeyer et al.
6,285,291 B1 9/2001 Knox et al.
7,075,646 B2 7/2006 Cole
2006/0114112 A1 6/2006 Cole
2007/0024459 A1 2/2007 Cole
2008/0001767 A1 1/2008 Cole
2008/0018485 A1* 1/2008 Kadwell et al. ............. 340/630

FOREIGN PATENT DOCUMENTS

EP 0 638 885 B1 1/1999

OTHER PUBLICATIONS

International Search Report and Written Opinion of The International Searching Authority, mailed Oct. 2, 2008 corresponding to International application No. PCT/US2008/070826.

* cited by examiner

*Primary Examiner*—Robert R Raevis
(74) *Attorney, Agent, or Firm*—Husch Blackwell Sanders Welsh & Katz

(57) ABSTRACT

An aspirated smoke detector includes an ambient air flow separation element in combination with a smoke sensing chamber. The flow separation element can be an active or a passive element. Separated ambient, carrying relative small particles can flow into the sensing chamber. Ambient carrying relatively larger particulate matter is excluded from the sensing chamber.

12 Claims, 6 Drawing Sheets

APPARATUS AND METHOD OF SMOKE DETECTION

CROSS-REFERENCE TO RELATED APPLICATION

This application claims the benefit of the filing date of U.S. Provisional Application Ser. No. 60/951,505 filed Jul. 24, 2007 and entitled "Apparatus and Method of Smoke Detection". The '505 Provisional Application is incorporated herein by reference.

FIELD

The invention pertains to aspirated smoke detectors. More particularly, the invention pertains to such detectors which limit the volume of ambient atmosphere that flows through an associated detection chamber.

BACKGROUND

Various types of aspirated smoke detectors are known. Such detectors usually include a detection chamber in combination with a fan or blower which draws ambient air through or injects ambient air into the chamber.

Aspirated detectors have been disclosed and claimed in U.S. Pat. No. 6,166,648, which issued Dec. 26, 2000 and is entitled, Aspirated Detector. The '648 patent is incorporated herein by reference.

While aspirated detectors as in the '648 patent are useful and effective for their intended purpose, there is a continuing need to try to avoid polluting, filters associated with aspirated detectors as well as the detection chamber, with dust and other airborne pollutants.

DETAILED DESCRIPTION

Figure 1:
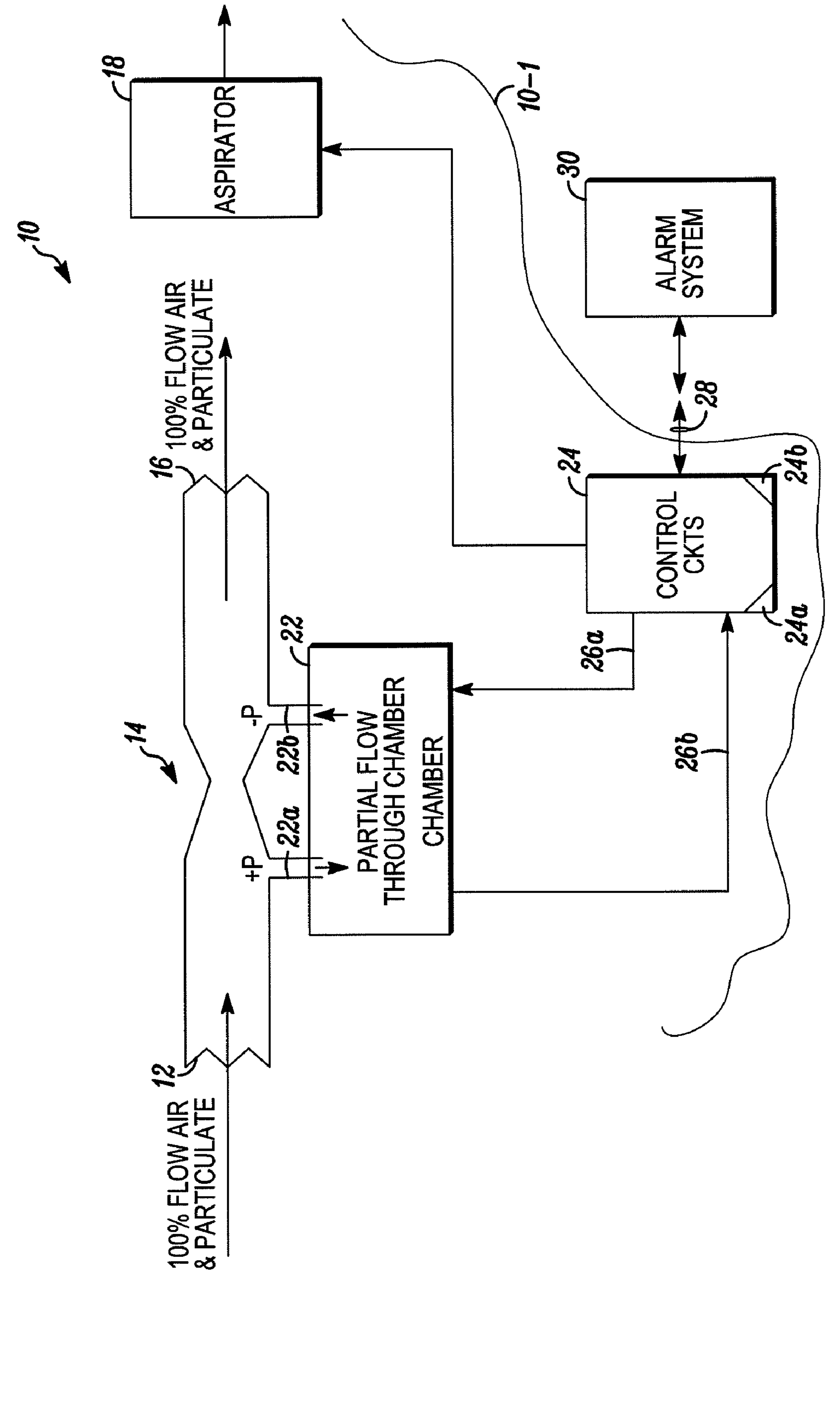
FIG. 1 is a diagram of a first embodiment of the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention implement two functions when used for handling airflow within a High Sensitivity Smoke Detector. One function extends detector service life by keeping larger, unwanted particulate from the detection chamber. A second function aides in performing the dust discrimination function that is accomplished within the chamber with the use of both optical design and signal processing.

In accordance with embodiments of the invention, an air stream within an aspirated smoke detector can be directed off at a selected angle that will cause larger, heavier particles to be more influenced by the effects of inertia. These larger particles will tend to follow a straight forward path while the smaller particles (smoke) will more easily follow a different (alternate) path that will be off the main path at some angle. This alternate air stream will be used for detection. The heavier, larger particles will thus be excluded from the sensor cavity or chamber.

An aspirated smoke detector which embodies the invention can include a smoke detection chamber for use in detecting smoke particles and an aspirator, for example, a blower or a fan, for use in pulling air through a network of pipes to the device. The "alternate path" will direct a smaller, representative sample of air/particulate through the chamber. This detection chamber is highly sensitive to any changes in ambient conditions within itself and therefore should remain as clean as possible. Filters are another method of keeping out the particles. This "alternate path" could eliminate the need for a filter.

In yet another aspect of the invention, particles can be separated into two groups using a cyclone or virtual impactor. The small particle group is contained in the major flow and the large particles are predominantly in the minor flow outputs. The particle concentration of each group is measured with separate scattering volumes. Contamination particles such as dust are predominantly large with some small particles that may appear to be smoke. Smoke particles are predominantly small with some large particles. The small particle concentration measurement is reduced by the large particle scattering measurement in the minor flow. This offset will reduce errors due to inefficiencies in separation and desensitize the detector to dust particles that have a distribution into the small particle size range.

The sampled air can be pulled into the detector using a blower or a fan. The sampled air goes into a virtual impactor that separates particles into two separate outputs. Each output goes into its own scattering volume and is measured for particle concentration. Large particles are predominant in the minor flow and small particles predominate in the major flow.

The large particle measurement from the minor flow of the virtual impactor can be measured using backward scattering. Backward scattering is more sensitive to non-absorbing particles such as dust, water, white powders.

The small particle measurement from the major flow of the virtual impactor can be measured using forward scattering. Exemplary light sources can include a light emitting diode or a laser. Exemplary light receiver can be a photo diode. Light color is preferably blue since it produces more scattered light for small particles than infrared.

The amplifiers can be calibrated such that for a given concentration of a dust "standard" (i.e., Sodium bicarbonate, Portland cement), the outputs are the same. The output of the minor flow scattering can be subtracted from the output of the major flow scattering. The result is used to indicate a concentration of smoke.

In one aspect of the invention, the airflow divider can be implemented with a rectangular chamber. Under the divider within a predetermined distance is a hole with a selected diameter. The divider is hollow on the inside and the air sample flows thru the inside. The air flows from the pipe into the rectangular chamber, is divided at the divider and flows down on both sides.

The air is pulled into the hole under the divider with a fan. The fan also creates a negative pressure inside the divider. Since the hole restricts the air flow, part of the air will be forced thru the inside of the divider and then thru the detection chamber. The distance from the hole and the inside of the divider is selected such that heavy particles won't get lifted vertically and therefore do not enter the inside of the divider.

Additionally, since the heavy particles can be expected to flow in the center of the pipe, than those particles will flow into the hole since that path represents the shortest distance to exit the divider.

In summary, preferably, only a partial air sample will flow thru the smoke detection chamber. Limiting the flow of air going thru the chamber can be expected to reduce pollution of any associated filter and minimize pollution of the chamber with dust and other pollutants. Thus, the air flow into the chamber will represent a sample of the entire air stream and preferably will not carry relatively large particles.

It will also be understood that the separator elements can be implemented as passive elements, such as cyclone separators. Alternately, particulate matter can be separated using active, electrically energized elements all without limitation.

FIG. 1 illustrates an aspirated detector 10 in accordance with the invention. Detector is carried, at least in part by a housing 10-1.

The embodiment of FIG. 1 has an ambient air inflow port 12, a constricted region 14, which establishes a pressure differential, and an outflow port 16. The outflow from port 16 is in fluid flow communication with an aspirator 18. As a result of the pressure differential developed at region 14, smaller, lighter particles of airborne particulate matter will be diverted from the flow from ports 12-16 as discussed below.

Aspirator 18 can be implemented as a fan, or other element which produces a reduced pressure at port 16 thereby drawing ambient air and associated particulate matter into port 12.

Chamber 22, a smoke detection chamber receives a partial flow of inflowing ambient air with larger particles excluded. Chamber 22 can be implemented as a photoelectric, an ionization, or both, sensing chamber without limitation. The exact details of smoke detection chamber 22 are not a limitation of the invention.

Control circuits 24 are coupled to aspirator 18 and chamber 22. Circuits 24, which could be implemented, at least in part, with a programmed processor 24*a*, and associated executable control software 24*b*, can activate a photoelectric implementation of chamber 22 via a conductor 26*a*. Smoke indicating signals can be received via conductor 26*b* at the control circuits 24.

Circuits 24 can process signals on line 26*b* to establish the presence of a potential or actual fire condition and couple that determination, via a wired or wireless communications medium 28 to an alarm system control unit 30.

In the detector 10 larger airborne particles flow from port 12 to port 16 without being diverted into chamber 22. Hence pollutants such as dust particles and the like will be excluded from chamber 22.

Figure 2:
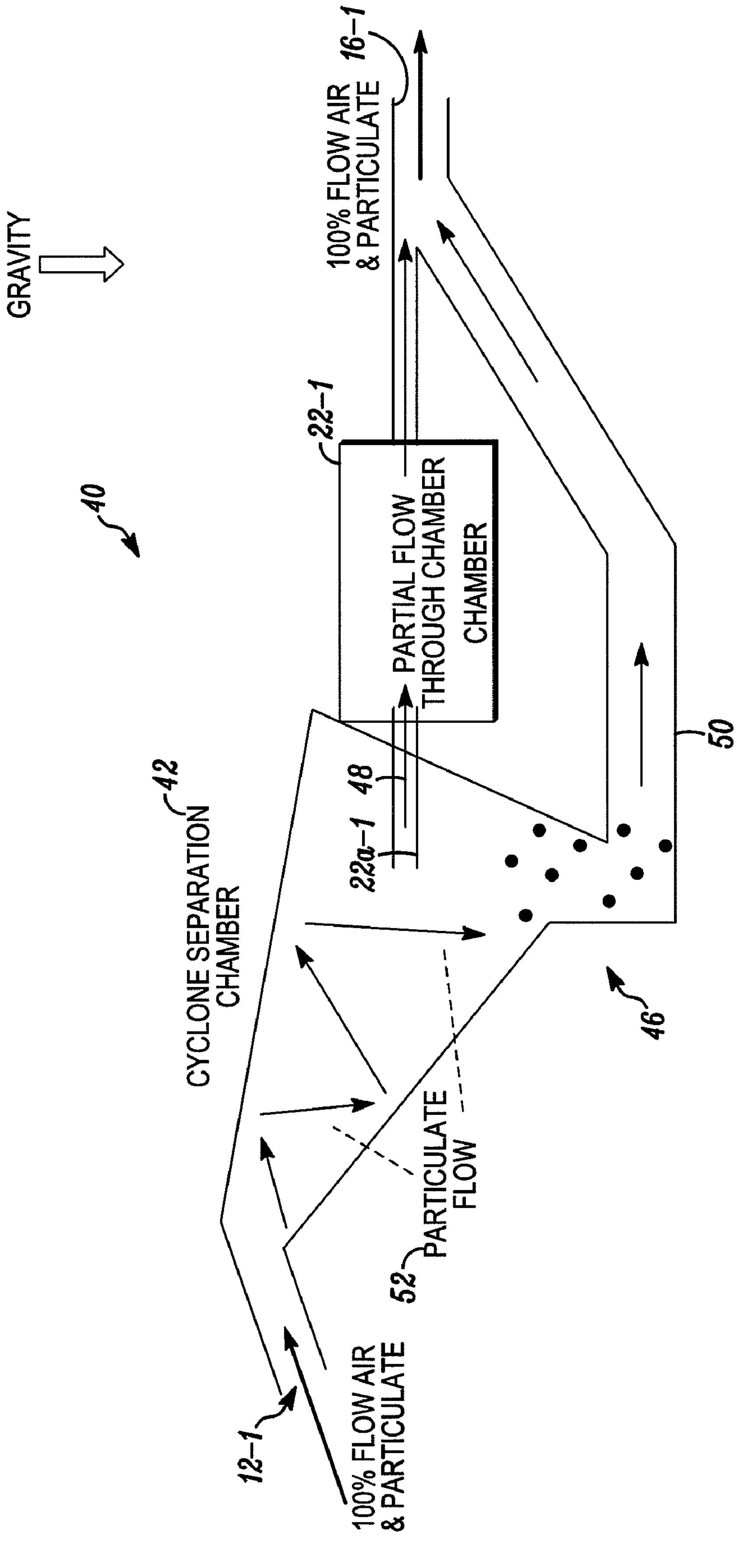
FIG. 2 is a diagram of a second embodiment of the invention.

FIG. 2 illustrates a detector 40 having an inflow port 12-1, and an outflow port 16-1. A cyclone separator 42 is coupled between port 12-1 and sensing chamber 22-1 (comparable to chamber 22 previously discussed). Separator 42 separates out undesired larger particulate matter, indicated at 46 from a partial inflow 48 into chamber 22-1.

The separated particulate matter 46 is coupled to the output port 16-1 by conduit 50. An aspirator, such as aspirator 18 can be coupled to output port 16-1 as discussed with respect to detector 10, FIG. 1. Alternately, an aspirator can be coupled to inflow port 12-1 and inject ambient into the separation chamber 42.

As illustrated in FIG. 2, particulate flow 52 through chamber 42 is away from inflow port 22*a*-1 of chamber 22-1 and toward by-pass conduit 50. In this embodiment, gravity assists in collecting particulate matter 46 at conduit 50.

Figure 3:
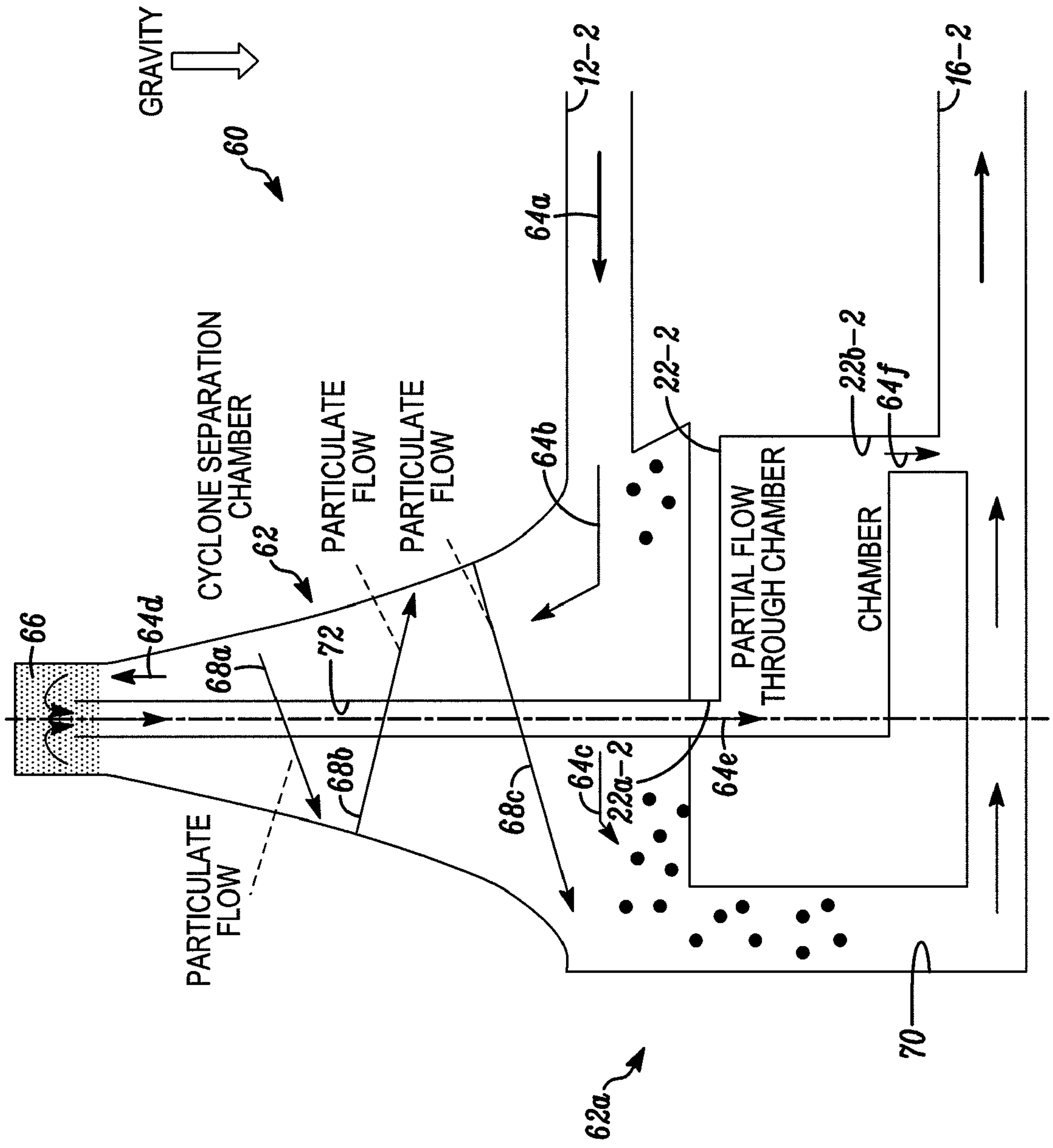
FIG. 3 is a diagram of a third embodiment of the invention.

FIG. 3 illustrates a detector 60 having an inflow port 12-2 and an outflow port 16-2. A cyclone separator 62 is coupled between port 12-2 and sensing chamber 22-2.

Ambient inflow to detector 60, indicated by flow arrows 64*a, b* enters chamber 42 and travels toward filter 66. Inflow 64*c* travels toward a particulate collecting region 62*a*.

Chamber 62 separates out the larger particulate matter which flows as indicated 68*a, b, c* toward the region 62*a*. Particulate flow and a portion of the incoming ambient atmosphere, indicated at 64*c*, is toward by-pass conduit 70 which is coupled to output port 16-2.

Chamber 62 directs a portion 64*d* of incoming ambient, without the larger heavier particulate matter toward and through filter 66. Outflow 64*e* from filter 66 flows through conduit 72 and into sensing chamber 22-2 via inflow port 22*a*-2. Chamber 22-2 could be coupled to control circuits, such as circuits 24 of FIG. 1.

Out-flowing ambient 64*f* is in turn coupled to output port 16-2 via conduit 70. Gravity also contributes to the separation process in the detector 60.

Figure 4:
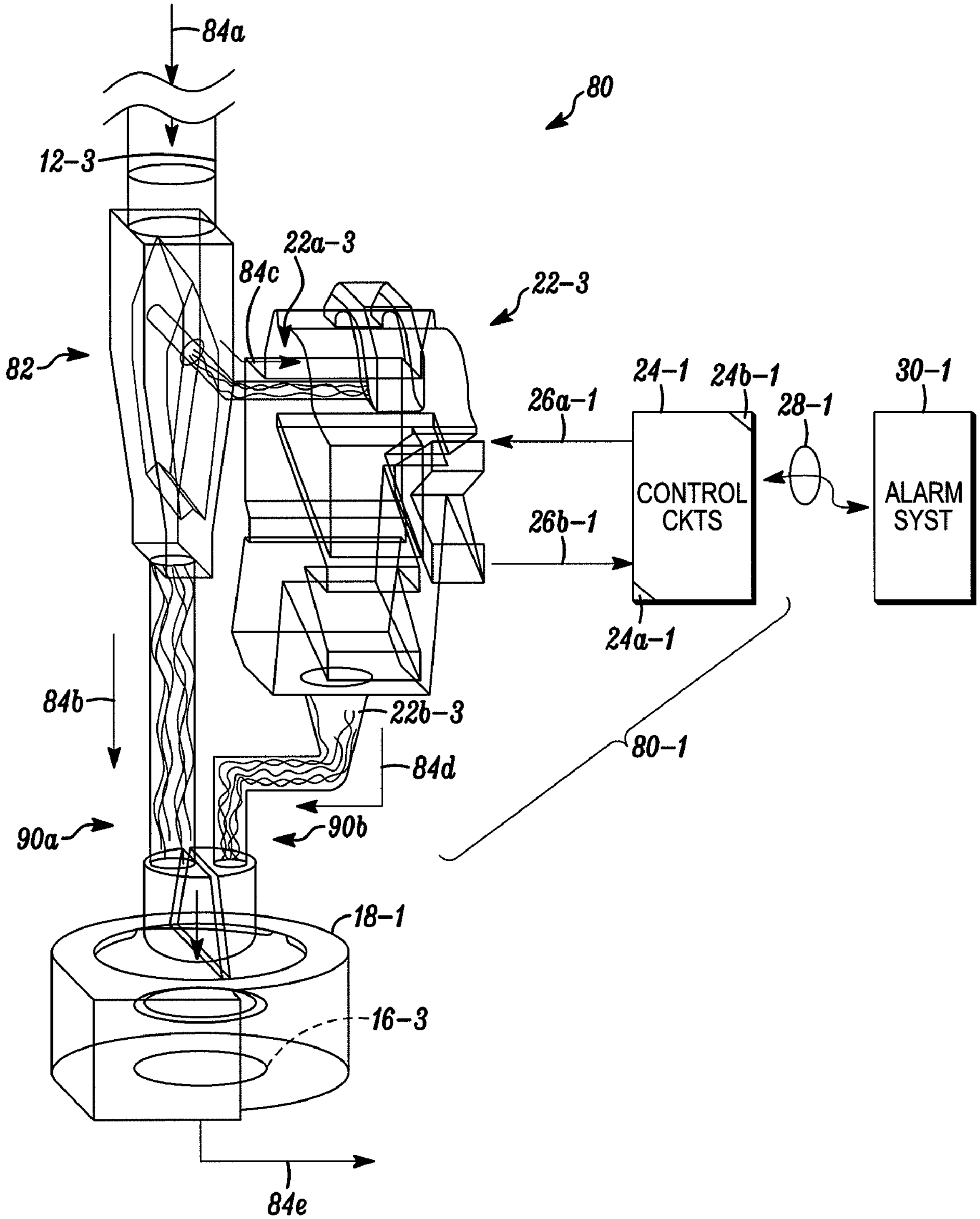
FIG. 4 is a diagram of a fourth embodiment of the invention.

FIG. 4 illustrates another aspirated detector 80, contained at least in part in a housing 80-1. Detector 80 has an ambient air input port 12-3 which is coupled to a separator element 82. The structure of element 82 is illustrated in more detail in FIGS. 5A, B.

Separator element 82 divides the inflowing ambient air and particulate matter 84*a* into a heavier, or larger, particulate matter carry portion 84*b* and a second portion 84*c*. The portion 84*c* without dust or other objectionable pollutants is coupled to a smoke sensing chamber 22-3 via inflow port 22*a*-3.

Out-flowing ambient air 84*b*, 84*d* in conduits 90*a, b* is drawn into aspirator 18-1 and expelled 84*e* at output port 16-3. It will be understood that the configuration of the various elements of detector 80, as noted above is exemplary and other configurations, designs or arrangements come within the spirit and scope of the invention.

Detector 80 can include control circuits 24*b*-1 as discussed above with respect to FIG. 1 and control circuits 24. Detector 80 can be in communication with alarm system 30-1 via communications medium 28-1.

Figure 5A:
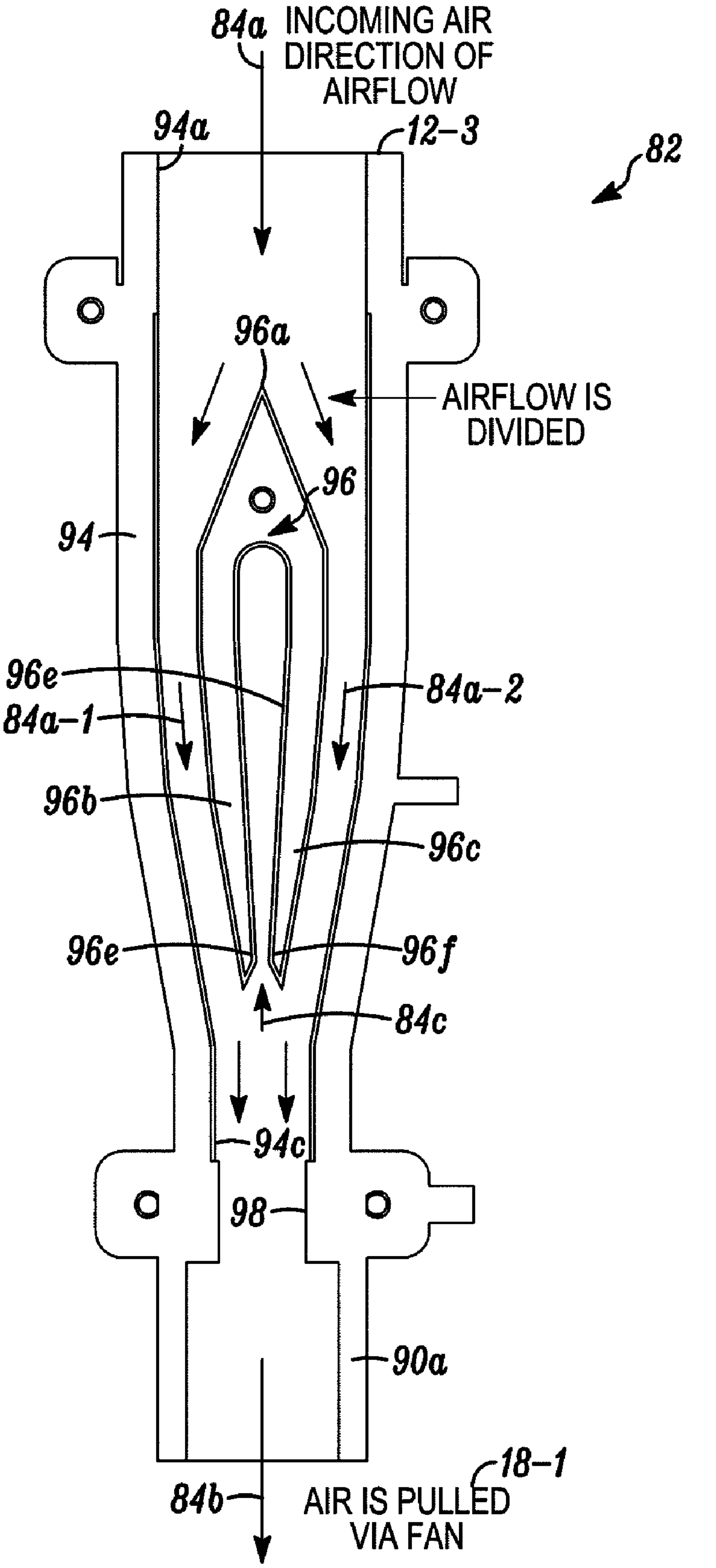
FIGS. 5A, 5B are front and side views respectively of a separator of ambient air usable in the embodiment of FIG. 4.

FIGS. 5A, B are front and side sectional views of separator element 82. Element 82 has a housing 94 with an inflow air path 94*a* which extends from input port 12-3 toward a first end 96*a* of a hollow divider 96. Airflow 84*a*-1, -2 flows along first and second sides 96*b, c* of divider 96 toward end regions 96*e, f*.

Once past end regions 96*e, f* the flow encounters a restriction 98. Restriction 98 is sized with a diameter that forces ambient air with the smaller particles 84*c* to move opposite a flow direction of 84*a*-1, -2 and into an interior region 96*e* of the divider 96.

Figure 5B:
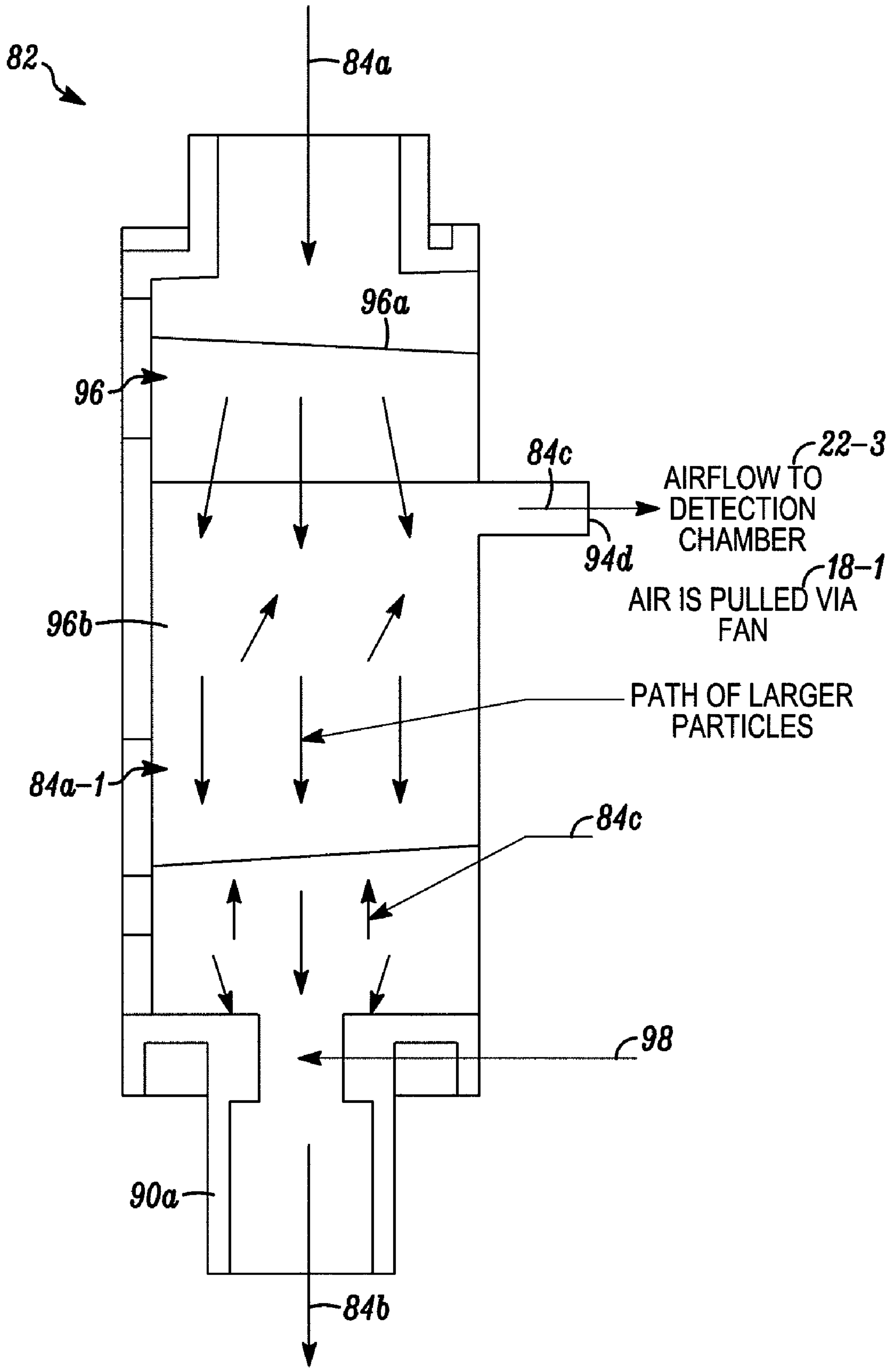

The ambient with the smaller particulate matter 84*c* flows through the region 96*e* toward an outflow port 94*d*, best seen in FIG. 5B, and toward the input port 22*a*-3 of the detection chamber 22-3. Ambient 84*b* carrying the heavier, larger particles flows along the channel 94*c*, past the restriction 98, through conduit 90*a* toward aspirator 18-1. Thus, larger, heavier particles are excluded from the smoke sensing chamber 22-3.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A smoke detector comprising:

a housing which defines an interior region and a separator element where the separator element includes a hollow diverter having an inflow port for receipt of ambient atmosphere flowing in one direction, the diverter being carries by the housing in the interior region with an outflow from the housing flowing substantially opposite the one direction and where a portion of flow through the housing is unidirectional and opposite the one direction; and a smoke sensing chamber in fluid flow communication with the interior region with the separator element directing a selected portion of ambient air in the interior region into the smoke sensing chamber.

2. A detector as in claim 1 which includes an aspirator coupled to the housing.

3. A detector as in claim 1 where the separator element is one of a passive element.

4. A detector as in claim 3 where the passive element comprises a selectively shaped mechanical structure.

5. A detector as in claim 4 which includes an aspirator coupled to the housing.

6. A detector as in claim 1 where the diverter has an outflow port coupled to the sensing chamber.

7. A detector as in claim 1 where the housing has an outflow port, where the sensing chamber has an outflow port and where an aspirator is coupled to both outflow ports.

8. A method of smoke detection comprising:

providing a flow of particulate carrying ambient atmosphere;

separating the flow into two partial flows with one partial flow including larger particulate matter than the other;

directing the other partial flow into a sensing region;

determining if the particulate matter directed into the sensing region is indicative of a potential fire condition and which includes, after providing, dividing the flow of particulate carrying ambient atmosphere into two parts;

where dividing includes directing the two parts in a first direction, and where separating includes moving the larger particulate matter in the first direction and which includes moving the other partial flow opposite the first direction.

9. A method as in claim 8 where separating includes providing a reduced pressure region into which the other partial flow moves.

10. A smoke detector comprising:

a hollow housing with a fluid inflow port and a fluid outflow port where at least some fluid can flow unidirectionally in a first direction from the inflow port to the outflow port;

a hollow divider positioned in the housing with a first end oriented toward the inflow port and a second end oriented toward the outflow port where the first end is closed and the second end is open and where the housing defines an internally tapered and restricted region in the vicinity of the second end whereby a portion of the fluid in the housing flows in a direction opposite the first direction into the second end of the divider; and a smoke sensing chamber in fluid flow communication with the second end of the divider.

11. A smoke detector as in claim 10 which includes an aspirator coupled to the outflow end of the housing and to the smoke sensing chamber.

12. A smoke detector as in claim 10 where the first end of the divider splits inflowing fluid into two substantially parallel paths.

* * * * *